L. WHITMAN & E. WHITMAN, Jr.
THRESHING MACHINE.
No. 3,497. PATENTED MAR. 20, 1844.
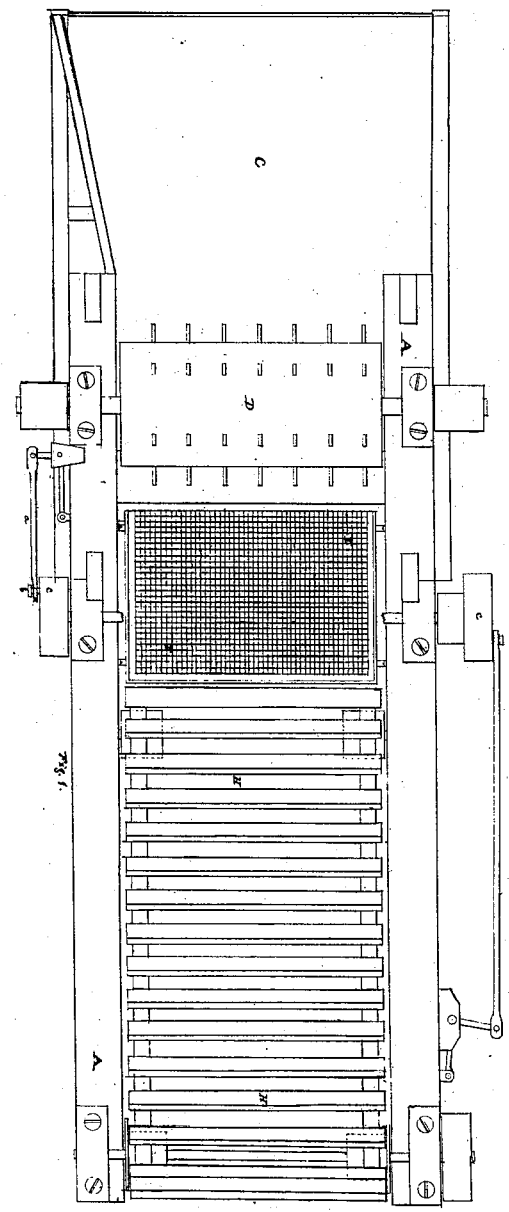
Only part of Drawing Accessible 1915.

UNITED STATES PATENT OFFICE.

LUTHER WHITMAN AND EZRA WHITMAN, JR., OF WINTHROP, MAINE.

THRESHING-MACHINE.

Specification of Letters Patent No. 3,497, dated March 20, 1844.

*To all whom it may concern:*

Be it known that we, LUTHER WHITMAN and EZRA WHITMAN, Jr., of Winthrop, in the county of Kennebec and State of Maine, have invented an Improvement in the Manner of constructing Machines for the Threshing and Cleaning of Wheat and other Small Grain; and we do hereby declare that the following is a full and exact description thereof.

In our machine the threshing is effected in the same manner as in many other machines for the same purpose, the grain to be threshed being fed in so as to pass under a threshing cylinder furnished with teeth and made to revolve above a concave in the ordinary way; as the straw leaves the threshing cylinder it is taken hold off by the teeth of a second cylinder denominated by us a conveying cylinder, furnished with suitable prongs or teeth that serve to beat it so as to aid materially in the perfect operation of the grain therefrom; and also to convey it into an endless belt of slats upon which it is carried off to such distance as may be desired; between the slats forming the endless belt such grain as may not have been previously disengaged from the straw may fall and be conveyed so as to be acted upon by the cleaning apparatus, this consisting of a revolving fan, screens, shakers, inclined boards, and other appurtenances, such as are known and used in other machines. Our improvement in this instrument consists in the employment of an additional screen, or sieve, so placed as to stand immediately under the second, or conveying cylinder and occupying the space between the threshing cylinder, and the endless belt of slats; said screen, or sieve, is to be agitated in the same manner as these screens, which are usually employed in the cleaning apparatus. In some of the machines heretofore constructed with a like intention the situation in which we place our above named screen, or sieve, has been occupied by stationary slats between which the grain might fall, but in this way the separation is much less perfect than when a screen duly agitated is employed.

In the accompanying drawings Figure 1 is a top view and Fig. 2 a side elevation of our machine, the cover and the conveying roller being removed in the former, for the purpose of showing the parts which would therein be hidden by them, and the side frame and enclosing plank being removed in Fig. 2 with a like view, A, A, in the former of the machine and B B a cover, which may be removed at pleasure; C is the feeding board, D the threshing cylinder, E the concave, F the conveying cylinder which takes hold of the straw by means of the teeth Q Q, and carries it on to the endless revolving band of slats H H. A screen I I which constitutes our improvement is suspended between the concave E, and the band of slats H, H, so that it may be readily agitated, or vibrated, when the machine is in operation; this scren may have meshes formed of wire in the ordinary way, or a plate of metal may be perforated so as to answer the same purpose; or it may be formed in other modes, all that is necessary being that the openings through it be such as will readily allow the grain to pass through them, while the greater part of the chaff and other foreign matter will be carried on with the straw. By this arrangement the grain and foreign matter will be more effectually separated from each other, at the instant the straw leaves the threshing machine, than could possibly take place under any of the combinations of the respective parts heretofore made in machines for the same purpose.

The fan, the screens or sifters, the inclined boards, the receptacle for the cleaned grain, and the other parts concerned in the cleaning of it after it passes through the screen I I do not require to be particularly described as they may be constructed in any of the ways now practiced. The shaking of the screen I, I, may also be effected in the same manner with that of the other screens or sifters, the necessary motion being derived from any of the revolving shafts; in the drawing it is shown as shaken by means of the bar *a*, actuated by a crank *b*, on the wheel *c*, by which the revolving rake is driven. The bar *d*, shows a similar movement from the whirl *c*, for shaking the lower screens. Having thus fully described the nature of our improvement in the construction of the machine for threshing and cleaning grain and shown the apparatus thereof. What we claim therein as new and desire to secure by Letters Patent is—

The manner in which we have combined the vibrating screen I, I, with said machine by placing it between the concave of the threshing apparatus and the endless belt of revolving slats, and below the conveying cylinder, so as to operate in the manner and for the purpose herein fully set forth; we do not claim any other part of the within described apparatus as of our invention.

LUTHER WHITMAN.

Witnesses to the signature of Luther Whitman:
SAM. P. BENSON,
SAM WOOD, Jr.

EZRA WHITMAN, JR.

Witnesses to the signature of Ezra Whitman, Jr.:
THOS. P. JONES,
EDWIN L. BRUNDAGE.